Jan. 20, 1970 G. L. HELLER 3,490,869
VORTEX REACTOR FOR CARBON BLACK MANUFACTURE
Filed Nov. 17, 1966 3 Sheets-Sheet 2

INVENTOR
GEORGE L. HELLER
ATTORNEY

United States Patent Office 3,490,869
Patented Jan. 20, 1970

3,490,869
VORTEX REACTOR FOR CARBON BLACK MANUFACTURE
George L. Heller, Monroe, La., assignor to Columbian Carbon Company, New York, N.Y., a corporation of Delaware
Filed Nov. 17, 1966, Ser. No. 595,091
Int. Cl. C09c 1/50; C01b 31/02; B01j 1/00
U.S. Cl. 23—209.4
21 Claims

ABSTRACT OF THE DISCLOSURE

Carbon black is produced by pyrolysis of a hydrocarbon feedstock with heat absorbed from hot combustion gases within which the feedstock is dispersed. The hot combustion gases are conveyed in a spiraling path through a convergent frusto-conical section of a furnace reaction chamber, thus forming a rapidly spinning vortex of the hot gases. The bulk of the hot gases hug the inner wall of the convergent section to form the body of the vortex, while a substantial cavity exists in the center of the body. The feedstock hydrocarbon is introduced into the vortex body at a point intermediate each end of the convergent section and is therein mixed with the hot gases under conditions of extreme agitation. There is no substantial thermal decomposition of the feedstock prior to entry into the body of the vortex, and combustion of the fuel for supplying heat for pyrolysis is substantially completed at the point where the feedstock enters the vortex body.

---

It has been known for some time that carbon black may be commercially produced by "swirling blast" processes wherein a selected hydrocarbon raw material (hereinafter referred to as "feedstock hydrocarbon" or "feedstock") is injected into the furnace reaction chamber and dispersed within a rapidly spiraling cylindrical mass of highly heated combustion gases produced by propelling a burning mixture of fuel and air in a circular direction at high speed.

The feedstock hydrocarbon is thus pyrolyzed within the resultant spiral of hot combustion gases to form carbon black, gaseous products of thermal decomposition of the feedstock and, in most instances, gaseous products of partial combustion of a minor portion of the feedstock with oxygen. Upon formation, the carbon black becomes suspended in the gaseous products of the pyrolysis reaction so that an aerosol is formed. The areosol is subsequently fractionated to recover the end product, carbon black.

By adjustment of flexible process parameters, it has been possible to commercially produce a large variety of grades of carbon black while employing the "swirling blast" process. For instance, properties of the black may be controlled by regulation of such conditions as the ratio of feedstock to hot combustion products employed in forming the reaction mixture, the degree of turbulence present in the reaction chamber during formation of the black, composition of the hot combustion products employed in the pyrolysis reaction, and reaction temperature and time.

Older type reactors employed in the "swirling blast" process comprise a cylindrical combustion chamber which is interconnected axially with a cylindrical reaction chamber of substantially smaller diameter. An abrupt shoulder exists at the junction of the two chambers. A combustible mixture of fuel and air is introduced tangentially into the combustion chamber and is burned therein while swirling, and upon entering the reaction chamber these combustion gases form into a rapidly spinning cylindrical spiral which moves longitudinally through the reaction chamber to an outlet. In these reactors, the feedstock hydrocarbon is injected directly into the combustion chamber, and is henceforth conveyed either into the body of the spiral within the reaction chamber or else into the "eye" in the center of the spiral. In either case, the feedstock hydrocarbon is mixed with combustion gases before substantially complete ignition of the fuel, and hydrocarbon is dispersed within the hot gases under conditions of agitation and temperature which are relatively low.

More recently, "swirling blast" reactors have evolved which include a convergent frusto-conical section ahead of the furnace reaction chamber since such a configuration provides a smoother transition of the reaction mixture out of the combustion section into the carbon black formation zone than is availed by the aforementioned older reactors having an abrupt shoulder at the junction of the chambers. Not only is smoother combustion provided by a convergent section, but less erosion of the reaction chamber liner occurs. Consequently, operating efficiency and life of such reactors is considerably improved.

However, previous carbon black furnaces which include a convergent frusto-conical or venturi section located ahead of the carbon black formation zone are not constructed and operated in accordance with the present invention, which provides for the manufacture of new carbon blacks having heretofore unmatched performance properties, e.g., the ability to impart super-wearing capability—as proved by actual roadwear tests—to tire tread compositions comprising polybutadiene rubber. It should be pointed out that the majority of tire treads produced today contain polybutadiene, and the invention is, therefore, of considerable contemporary importance since carbon blacks produced by other methods do not impart equivalent on-the-road wear resistance to these treadstocks. In addition, blacks produced in accordance with the invention provide additional in-service benefits and desirable processing characteristics to the rubber compounds in which they are incorporated. Furthermore, a variety of grades of carbon black can be produced in accordance with the present invention, e.g. HAF-HS, ISAF, ISAF-HS, ISAF-LM, SAF, SAF-HS, SAF-LM, grades intermediate to those listed, and other grades.

The present invention is predicated upon the discovery that carbon blacks having outstanding performance characteristics can be produced by burning a fuel with free oxygen-containing gas, introducing the resultant hot combustion gases into a convergent frusto-conical section that is a part of the furnace reaction chamber, thus forming the hot gases into a rapidly spinning conical vortex having a substantial cavity and which tightens progressively as the gases move toward the outlet of the frusto-conical section, while introducing the feedstock hydrocarbon directly into the frusto-conical section at a point intermediate each end thereof so that the hydrocarbon enters the body of the vortex adjacent the inner wall of the frusto-conical section, with combustion of the fuel employed for supplying pyrolyzing heat to the feedstock being substantially complete at the point where the feedstock hydrocarbon enters the body of the vortex. Accordingly, comixture is avoided between the feedstock hydrocarbon introduced into the reaction chamber and substantial amounts of unburned or incompletely burned fuel, and although not wishing to be bound by theory, it is felt that negation or substantial reduction of comixture between the two aforementioned materials contributes at least in part to formation of properties which result in the unusual carbon blacks produced in accordance with this invention.

It should be pointed out that in previous processes employing the use of a convergent frusto-conical section ahead of the carbon black formation zone, the feedstock has been injected into combustion gases wherein ignition of the fuel is essentially incomplete at the point of hydrocarbon injection, or else the fuel is injected in such a way that it comixes with the feedstock prior to dispersion of the latter within the hot combustion gases. Furthermore, the feedstock hydrocarbon has been directed into, and through, the center of a conical spiral of the hot gases, rather than into the outer limits of the conical spiral of gases, while in other processes the feedstock has been injected into an enlarged cylindrical fuel combustion section, for dispersion within a burning mixture of fuel and air, prior to being conveyed into the confines of a smaller diameter convergent section located ahead of reaction chamber wherein the feedstock is pyrolyzed within a spiral of the hot combustion gases.

It will become apparent from this description that the instant invention provides significantly different operating features and results than the prior processes previously mentioned herein. In the present process, the hot combustion gases are injected at high velocity into the furnace reaction chamber and are directed toward the interior wall of the frusto-conical section to produce a well defined vortex wherein the bulk of the hot gases hug the interior of the sloping wall and thus form the body of the vortex, while a substantial cavity exists in the center of the body. The cavity, by definition, is a conical area, conforming to the internal periphery of the body, having a relatively lower pressure and circular velocity therein. Thus formed, the bulk of the gases introduced into the convergent frusto-conical section, i.e., those gases composing the body of the vortex, are forced into intimate contact with the wall of the convergent section as the spiral courses toward the outlet. This results from the fact that the tapered wall presents an ever-increasing obstructive effect during longitudinal movement of the gases, thus providing a prolonged "scrubbing" effect. In addition, the turbulence within the gases increases progressively as circular and longitudinal velocity increases while the spiral tightens. Consequently, the combined agitation produced within the gases by prolonged, forced wall-contact and ever increasing velocity is very intense and provides elevated parameter limits of mixing and at least partial pyrolysis of the feedstock hydrocarbon within the hot combustion gases that is not availed by the prior processes previously described. Accordingly, it will be appreciated that equivalently intense agitation can not be obtained if the vortex is not retained by a converging wall during introduction of the feedstock hydrocarbon into the body of the vortex nor if the bulk of the hot gases is not formed into a vortex body retained adjacent the converging wall. Therefore, maximal agitation effects for dispersion and at least partial reaction of the feedstock hydrocarbon is obtained in the present invention by introducing the feedstock hydrocarbon directly into the convergent frusto-conical section and directing the hydrocarbon forthwith into the body of the vortex, rather than the cavity, so that the hydrocarbon enters the body of the vortex prior to substantial thermal decomposition thereof. Since the agitation of the gases within the vortex body is so intense, thorough and uniform dispersion of the feedstock within the hot combustion gases is accomplished very quickly. Concurrently, elevation of the feedstock to pyrolyzing temperatures commences within the vortex and the heating is greatly facilitated not only by the thorough dispersion of the hydrocarbon but also by the considerable agitation occurring adjacent the convergent wall, since heat transfer from the wall to the hydrocarbon can occur very effectively both by conduction and radiation. In operation, the temperature of the hot combustion gases within the frusto-conical may be as great as 3500° F., but more generally may be within the range of 2400° F.–2800° F.

It is also essential to this invention that the fuel which is burned to supply heat for the pyrolysis reaction, separate from any partial ignition of the feedstock hydrocarbon which might occur, be substantially burned to completion prior to mixture of the feedstock with combustion gases which result from burning the fuel. In preferred embodiments of the invention, the fuel is essentially completely burned before the feedstock is introduced into the vortex. In any case, the fuel combustion will be completed to the point where maximum temperature within the combustion reaction zone will occur substantially ahead of the outlet of the frusto-conical section and generally prior to introduction of the feedstock into the body of the vortex. In this regard it is advantageous to thoroughly premix the fuel and free oxygen-containing gas prior to introduction into the furnace reaction chamber, since substantial combustion of the fuel prior to mixture of the resultant combustion products with the feedstock may be reliably assured with simple mixing arrangements. However, premixture of fuel and the free oxygen-containing gas outside the furnace reaction chamber is not essential, since a suitably designed combustion section located ahead of the frusto-conical section may be employed to provide sufficient internal mixing and combustion reaction time for complete ignition of the fuel prior to formation of the vortex. Since this invention contemplates the introduction into the furnace reaction chamber of unburned fuel mixtures, partially burned fuel mixtures, or the products of complete ignition of the fuel, the term "combustion gases" as used herein is intended to include all of the just mentioned gases unless otherwise specified or qualified.

To form the vortex having a substantial cavity, one or more tunnels may be employed for injecting the combustion gases tangentially, into the furnace reaction chamber, the injection being at sufficient velocity to create within the convergent frusto-conical section a vortex having substantial longitudinal velocity. More specifically, the longitudinal velocity will frequenty be on the order of one-half the spiraling velocity of the gases when the angle of inclination of the spiral is about 60° from the horizontal. With a convergent frusto-conical section of between 35° and 45°, the angle of inclination of the gas spiral within the vortex may be near 60° at the inlet of the convergent section, and near 0° at the outlet of the section, e.g. 10°.

When the combustion gases are injected into the furnace under low pressure, i.e., only a few pounds gauge pressure, a series of small diameter tunnels is preferred since the vortex body can thus be formed more easily than with one or two large diameter tunnels. Preferably, the longitudinal velocity of the vortex at the outlet of the convergent frusto-conical section should be within the range of about 300 to about 2600 linear feet per second when measured at a temperature between about 2500° F. to about 2800° F., and more preferably within the range of about 450 to about 1600 linear feet per second when measured at the same temperature condition. Where desirable, the furnace reaction chamber may be provided with a fuel combustion section, preferably of an essentially circular cross-section, located ahead of the convergent frusto-conical section for receiving the combustion gases as they enter the interior of the furnace. The fuel combustion section may be employed for completing combustion of the fuel prior to introducing the hot gases into the intercommunicating convergent section or simply to aid in formation of the gases into the vortex body, or both. When preferable and practical the fuel combustion section may include an axially located, inwardly extending heat resistant cylinder to create an annular space into which the combustion gases discharge from one or more tunnels, thus further aiding the formation of a vortex having a body wherein the bulk of the gases hug the wall of the convergent section.

The included angle and the length of the convergent frusto-conical section employed in this invention is subject to considerable variation within the limits of feasibility, but optimum results have been obtained when the included angle is between about 30° to 90° and the length of the section is at least equal to the diameter of the outlet opening. In more preferable embodiments an included angle between about 35° to 45° is employed with a section length of at least three times the diameter of the outlet. It will be apparent to those skilled in the art that the diameter of the outlet of the frusto-conical section is subject to variation and is dictated primarily by the velocity conditions required for effecting desirable carbon black properties at a chosen production rate for the black. Practicality must also be considered, i.e., normally the outlet diameter will be sized to permit utilization of readily available and economical apparatus for propelling the combustion gases into the furnace and through the outlet of the convergent section, since it will be readily understood that the pressure requirement for any particular gas throughput rate increases as the diameter of the outlet is decreased.

The invention is not restricted to one specific type of feedstock hydrocarbon, for in a general sense almost any hydrocarbon can be employed whether in gaseous, vaporized or liquid form. Usually, however, it is preferable to use a cracking or distillate residue hydrocarbon having a high molecular weight and a high content of aromatic compounds. To particular advantage, the hydrocarbon residue should have a content of aromatic compounds which is not less than about 65% by weight, a mean molecular weight within the range from about 100 to about 400 and a UOP characterization factor (K) within the range from about 9 to 10.5. Although some preheating may be required to provide a viscosity at which such hydrocarbons will flow readily in liquid form, they may be injected into the furnace chamber as an atomized spray of liquid droplets whereby vaporization of the hydrocarbon occurs by absorption of heat from the hot combustion gases.

The feedstock hydrocarbon may be introduced directly into the convergent frusto-conical section of the reaction chamber in any suitable manner so that it enters the body of the vortex intermediate each end thereof and disperses within the hot gases of the vortex body prior to substantial thermal decomposition of the feedstock. The hydrocarbon may, for instance be introduced through the sloping side wall of the convergent section from one or more points around the periphery of the vortex, but an especially advantageous technique is introduction of the feedstock into the interior of the frusto-conical section from an axial locus inside that section, while projecting the hydrocarbon outwardly from the locus into the body of the vortex. A heat insulated atomizer tip may, for instance, be located inside the convergent section at a point along its axis to produce a hollow cone pattern of droplets which travel outwardly into the vortex body at high velocity. Advantageously, the atomizer should be positionable, since repositioning of the feedstock discharge locus may be desirable from time to time. It will be understood that the momentum imparted to the outwardly projected feedstock must be regulated to assure entry into the vortex body while preventing penetration of considerable amounts of unvaporized feedstock to the sloping wall of the convergent section, since excessive impingement of the unvaporized material will result in coke formation on the wall, thus disrupting the intended flow patterns within the reaction chamber. In practice, optimum discharge patterns can be established by selection of a proper atomizer tip and regulation of the discharge pressure employed therewith. Accordingly, proper conditions can be readily established by those skilled in the art after several simple experiments.

The point at which the feedstock hydrocarbon is introduced into the frusto-conical section is subject to variation and is dictated primarily by the type of colloidal, chemical and performance characteristics desired of the carbon black being produced. When employing a convergent section having an included angle between about 30° to 90° and a length at least as great as the outlet diameter, the most preferred grades of carbon black are produced when the feedstock is introduced into the convergent section upstream of the outlet from a distance which is at least as great as the diameter of the outlet. More preferably, the feedstock hydrocarbon is introduced into the convergent section at a point upstream of the outlet at a distance therefrom which is between about one to four times the diameter of the outlet, such an introduction point being particularly applicable when the convergent section has an included angle of between about 35° to 45° and a length of at least four times the diameter of the outlet. With the cone angle and length just mentioned, the point at which the feedstock hydrocarbon is introduced into the convergent section upstream from the outlet may to particular advantage be at a distance from the outlet which is at least twice the outlet diameter, and more particularly two to four times the diameter.

When employing an axially positioned atomizer tip for discharging an atomized spray of liquid droplets of the feedstock hydrocarbon into the vortex, the distance of the tip from the convergent section outlet has considerable influence on the properties of the carbon black formed by pyrolysis of the feedstock; i.e., the colloidal, chemical and performance properties of the black are frequently considerably dependent upon the position of the atomizer tip from the convergent section outlet. The proper position for any specific type of tip for producing any particular grade of carbon black can best be determined for any given furnace by experimentation.

The conical angle at which liquid droplets is discharged from the atomizer tip is also subject to considerable variation, the main consideration being that the bulk of feedstock traverses the "eye" of the vortex and intercepts the high velocity stream of gases adjacent the convergent section wall. Naturally, however, the conical angle at which the droplets discharge from the atomizer tip will influence optimization of the axial locus from which the feedstock hydrocarbon is introduced within the frusto-conical section, i.e., with any given tip position, the point at which the hydrocarbon enters the vortex is dependent upon the conical discharge pattern of the droplets.

As a general rule, the most preferred results are obtained when the tip is withdrawn from the convergent section outlet to a distance which permits turbulent mixing between the feedstock hydrocarbon and the vortex gases adjacent the sloping wall of the convergent section. Rubber grades of carbon black characterized by high treadwear resistance are produced when the feedstock hydrocarbon enters the gases of the vortex body at a point which is somewhat removed from the convergent section outlet, while high-color grades of black for application in inks, paints, etc. are best produced when the feedstock enters the vortex gases at a point which is proximal to the convergent section outlet. In this regard, it should be pointed out that directional changes in the fineness and structure properties of the carbon black, as indexed by tinting strength and oil absorption tests, may occur when the point at which the feedstock enters the body of the vortex is altered, i.e., the black may become somewhat coarser and the structure may increase somewhat as the point of feedstock entry into the vortex body is removed further and further from the convergent section outlet. As a consequence, the particle size of the carbon black may be coarsest when the structure is highest, and vice versa. Generally, alteration of the aforementioned properties by relocation of the feedstock introduction point is most pronounced within a zone intermediate each end of the convergent section, with the length of the zone being shorter than the entire section and upstream of the outlet thereof. From the foregoing discussion, it will be understood that by incremental retraction of the feedstock introduction point from the convergent section outlet, a specific point may be found for optimizating fineness and structure to obtain maximum values for each during a given operation, and that further retracting of the introduction point will result in higher structure and lower fineness.

When practicing the invention to produce carbon blacks which impart unusually high treadwear resistance to treadstocks compounded from blends of butadiene-styrene rubber and polybutadiene rubber, it has been observed that the optimum point of introducing the feedstock into the body of the vortex may frequently be in the proximity of the point at which structure and fineness are optimized for maximum values in the same operation, as previously described.

Advantageous results have been obtained with this invention while employing atomizer tips which provide a hollow conical discharge pattern of liquid hydrocarbon droplets, but it will be understood that the droplets may be discharged in a radial pattern, or the droplets can be discharged in a solid cone pattern provided the bulk of the droplets enter the body of the vortex within the convergent section. It will be appreciated that if the discharge locus is too near the convergent section outlet, the bulk of the droplets may be swept into the "eye" of the vortex rather than into the body thereof. With furnace reactor employed in Examples 1 through 5, atomizer tips providing a relatively thin cone of droplets at an included angle of 60°–80° have been advantageously employed.

Since complete pyrolysis of the feedstock hydrocarbon rarely occurs within the convergent frusto-conical section, the vortex may to advantage be discharged into another section of the reaction chamber which intercommunicates with the convergent section through its outlet and extends downstream to provide additional reaction space. This downstream extension of the reaction space may have a cylindrical configuration, or any other that is suitable, but particularly efficacious results are obtained when the gases forming the vortex are discharged into an extended, divergent frusto-conical section wherein the gases of the vortex are reformed into a progressively expanding body. More particularly, the divergent frusto-conical section should have an included angle between about 7° and 10° since the flow pattern is converted from spiraling to linear or plug flow. Consequently, the gases which composed the vortex egress from the convergent section outlet substantially longitudinally at a velocity which is relatively uniform and this condition prevails over the entire cross-section and length of the divergent section. This provides the advantage that progression of the carbon-forming reaction occurs in such a way that the dehydrogenating, condensed, hydrocarbon particles, which exist during transition of the feedstock to finished carbon black, are subjected to more uniform reaction conditions than would exist were the longitudinal movement of the gas accompanied by spiraling or some other pattern wherein the longitudinal movement was substantially non-uniform. It should also be pointed out that during operation a positive pressure exists in the convergent section of the reactor, while a slight negative pressure may exist in the downstream divergent section. This negative pressure in itself promotes expansion of the gases as they leave the vortex and provides treatment of the particles suspended therein at uniform contact time. Consequently, utilization of a divergent frusto-conical section provides for progressive and uniform longitudinal flow of the aerosol. Therefore, the reaction for formation of the carbon black is relatively more uniform than that which occurs in the tangential flow pattern of a cylindrical section. The length of the divergent frusto-conical section should be substantially greater than the diameter of the outlet of the convergent section, advantageously about 10 to 15 times the diameter of the outlet.

As has previously been pointed out, the hot combustion gases from which the vortex is formed are produced by burning a fuel with a free-oxygen containing gas. While the invention contemplates the use of such fuels as hydrogen and carbon monoxide, hydrocarbons are employed to better advantage in most cases, especially gaseous paraffinic hydrocarbons such as natural gas and liquid hydrocarbons such as fuel oils. In a like manner, air may be employed as the free oxygen-containing gas although oxygen-enriched air may, for example, be employed instead.

Proportioning of the fuel and free-oxygen-containing gas is subject to variation, but for producing most grades of carbon black it is desirable to provide a slight excess of free-oxygen, since desirable carbon black properties may thus be attained. When employing air at ambient temperature and natural gas having a B.t.u. rating of about 1000 per s.c.f. to produce the hot combustion gases, in excess of 11 s.c.f. of air may be mixed with each standard cubic foot of the natural gas to provide a combustible mixture that will avail sufficient amounts of excess oxygen when the mixture is burned. To particular advantage, the amount of air mixed with each standard cubic foot of the natural gas should be within the range of about 13 to about 17 standard cubic feet.

Carbon black production rate, yield and control of carbon black properties can be improved by using preheated air instead of air at ambient temperature, i.e., the air is heated substantially above ambient temperatures prior to initiating combustion of the fuel. Preheating the air to a temperature within the range of about 600° F. to 1300° F. is particularly desirable, and when a 1000 B.t.u. natural gas is employed as the fuel, optimum proportioning will generally reside within the range of about 13 to about 21 standard cubic feet of air per standard cubic foot of natural gas. It should be pointed out that when employing preheated air, care must be exercised to avoid using combustible mixtures too rich in fuel lest combustion temperature reach a point where the refractory liner of the furnace is destroyed. Consequently, combustible mixtures of optimum proportions will frequently reside within the upper limits of the previously stated range.

When using air and a hydrocarbon to produce the hot combustion gases, sufficient input rates should be employed to provide an actual linear velocity of at least 300 feet per second, and preferably higher, at the outlet of the convergent section. When a high molecular weight, highly aromatic residue hydrocarbon is concurrently employed as the feedstock it may advantageously be introduced into the furnace reaction chamber at a rate which is within the range of 0.8 to 2.0 gallons (60° F.) per 1000 s.c.f. of air, when air at ambient temperature is employed, and within the range of 1.0 to 2.5 gallons (60° F.) per 1000 s.c.f. of air when the air is preheated to a temperature within the range of 600° F. to 1300° F.

Operating efficiency of the present invention may be further enhanced by the use of mixing grids to provide thorough mixture of the fuel and free-oxygen containing gas prior to ignition of the fuel. Construction and use of suitable grids which may be employed in the instant invention is described in U.S. Patent 3,322,506.

In some instances it may be desirable to impart certain special and beneficial properties to the carbon black, notably increased structure, by introducing a hydrocarbon, separate from the feedstock, into the carbon black formation zone of the furnace reaction chamber. Such a method for structure improvement of the carbon black is described in U.S. Patent 2,985,511, issued May 23, 1961, whereby gaseous paraffinic hydrocarbons are separately injected into, and mixed with, the hot blast flame gases in the zone of the furnace chamber where the feedstock hydrocarbon is injected, and is present in the hot gases during the initial formation of the carbon black particles. Accordingly, a gaseous paraffinic hydrocarbon may be so employed with the present invention, although it is also possible to use a liquid hydrocarbon, which may, for instance, be the same as the feedstock, by injecting the liquid hydrocarbon as an atomized spray of droplets into the reaction chamber. When natural gas is separately injected as previously described for increasing structure, and the feedstock is a high molecular weight, highly aromatic hydrocarbon residue that is injected into the furnace as a spray of liquid droplets, the natural gas may be separately introduced into the furnace chamber at a rate which is within the range of about 5 to about 40 standard cubic feet per gallon (60° F.) of feedstock hydrocarbon introduced into the furnace reaction chamber, and more advantageously at a rate of about 10 to about 20 cubic feet of natural gas or liquid hydrocarbon equivalent, per gallon of feedstock.

Within the furnace reaction chamber, the carbon black formation zone may extend over a distance which includes a substantial portion of the convergent frusto-conical section and the downstream section which extends beyond the outlet of the convergent section. Substantial quantities of carbon black may be formed within the convergent section ahead of the outlet since pyrolysis of the feedstock therein occurs under reaction conditions which do not exist in prior reactors. Generally, the reaction will continue within the downstream section beyond the outlet of the convergent section and the entire carbon black formation zone will be maintained at temperatures within the range of about 3500° F. to about 2500° F. For instance, the hot combustion gas into which the feedstock is injected may have a temperature of 3500° to 2900° F. substantially ahead of the outlet of the convergent section and a temperature of 3200° to 2600° F. at the outlet, while a temperature of 2600° to 2400° F. is maintained downstream from the outlet. It will be understood that these temperatures represent the actual temperature of the hot combustion gases in the carbon black formation zone since the refractory walls which bound the zone may have a somewhat lower temperature. In almost all instances, formation of the carbon black will be followed with water quenching of the hot combustion gases to prevent over exposure of the carbon black to the hot gaseous atmosphere as would result in excessive lowering of yield or adverse effects upon the chemical and colloidal properties of the black. Accordingly, the hot gases may be quenched to a temperature below about 1900° F. and more generally to a temperature within the range of 1500°–1750° at a selected point within the downstream section of the reaction chamber.

The invention will be further described with reference to the drawing in which.

Figures 1, 2:
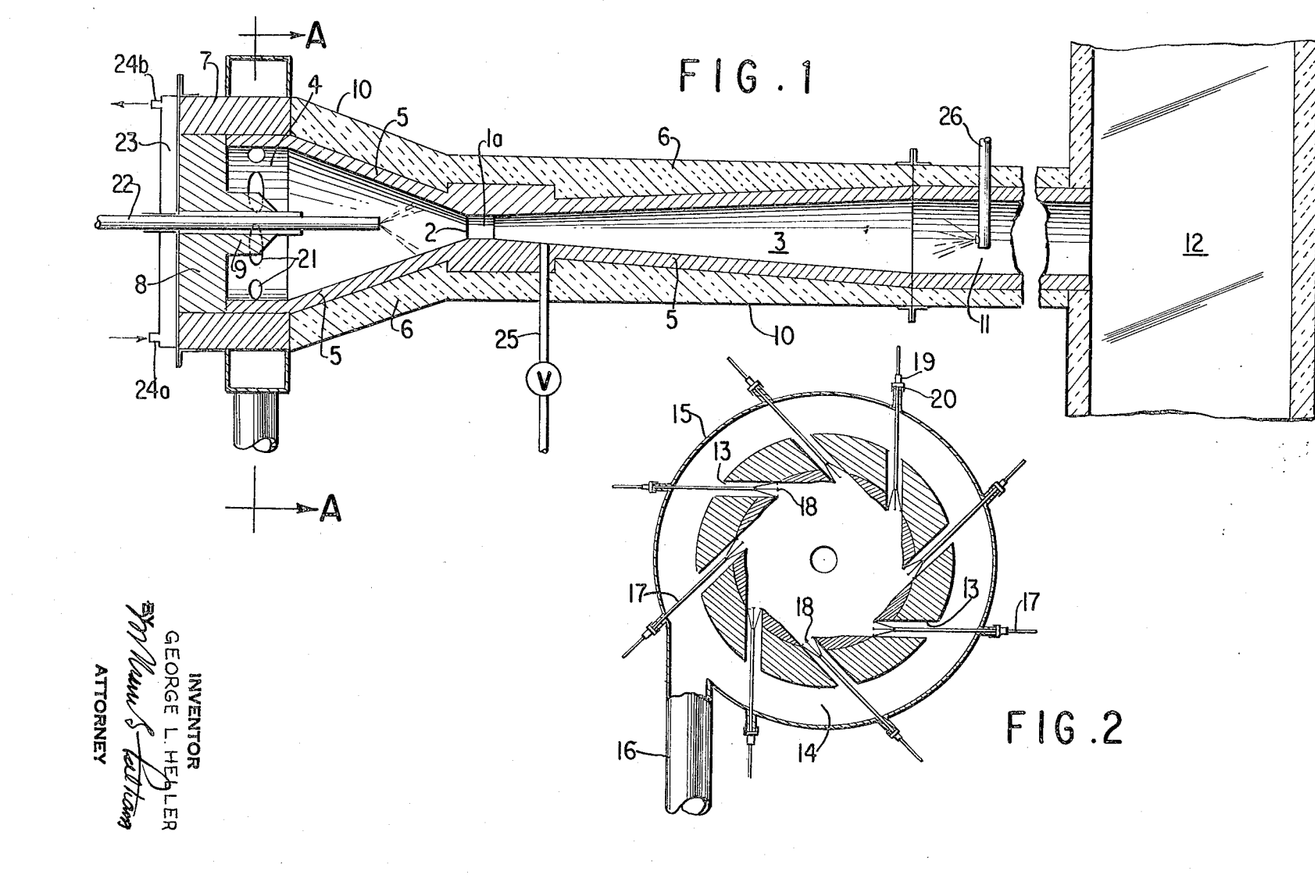
FIGURE 1 is a side view of a furnace reactor which may be used in producing carbon blacks in accordance with the invention when using air and a normally gaseous fuel to produce the hot combustion gases.
FIGURE 2 is a cross-sectional view of the reactor along the line A—A.

In FIGURE 1, the reactor has a convergent frusto-conical section 1 with an outlet 2 which leads into a downstream divergent frusto-conical section 3. Intercommunicating with the large end of the convergent frusto-conical section is a cylindrical fuel combustion section 4. Each of the above mentioned sections is lined with a layer of high temperature refractory 5. This refractory liner is in turn covered with a layer of high temperature thermal insulation 6 from the large end of the convergent section to the outlet end of the divergent section. Another layer of high temperature refractory 7 surrounds the refractory layer 5 of the combustion section and is also used to form the end closure wall 8 for that section. In the illustrated case, the end closure wall is also provided with a refractory cylindrical section 9 that extends axially into the fuel combustion section 4, thus forming an annular space between the external wall of the cylindrical section and the internal wall of the fuel combustion section. The exterior of the reactor is covered by a metal shell 10. The divergent section 3 interconnects downstream with a refractory lined and insulated breeching chamber 11 which discharges into a precooler generally identified at 12.

The fuel combustion section 4 is provided with a series of tunnels 13 which intercommunicate with an air bustle 14 bounded by a metal wall 15. A metered stream of air is introduced into the bustle through conduit 16. Air enters the tunnels from the bustle and is mixed therein with a fuel gas fed into the tunnels by means of jets 17 having supply conduits which extend outside the bustle and are connected to a header, not shown, through which a metered stream of the fuel gas is furnished to each jet. Each of the jets 17 is provided with a mixing grid 18, through which the imperfectly mixed fuel is thoroughly mixed with the air by passing through a multiplicity of small orifices in the grid. The jets and attached grids are positionable within the tunnel by sliding them back and forth within slip collars 19 attached to couplings 20 on the bustle wall. From openings 21, a partially or substantially completely burned fuel mixture is discharged tangentialy into the fuel combustion section 4.

The refractory cylindrical section 9 which extends into the fuel combustion section 4 has a central opening through which a feedstock atomizer assembly, generally represented at 22, can be introduced into the convergent frusto-conical section and moved back and forth for axially positioning an atomizer tip within the convergent section.

With the furnace illustrated in FIGURE 1, the outer surface of the refractory end wall 8 is provided with a water jacket 23, with water taps 24a and 24b, to prevent overheating of the end wall and to protect the operator who must position the feedstock atomizer assembly during operation of the reactor. Downstream from the convergent section outlet, a conduit 25 extends radially through the wall of the reactor to provide means for introducing a metered stream of hydrocarbon, separate from the feedstock, into the carbon black formation zone of the reaction chamber. Still further downstream, a conduit 26 with an atomizing tip extends into the breeching for introducing an axially directed spray of water whereby the aerosol from the reaction chamber is partially but suddenly cooled before passing to the precooler 12 wherein further cooling is effected. From the precooler, the aerosol is conveyed to a carbon black separation and collection system, not shown.

Figures 3, 4, 5:
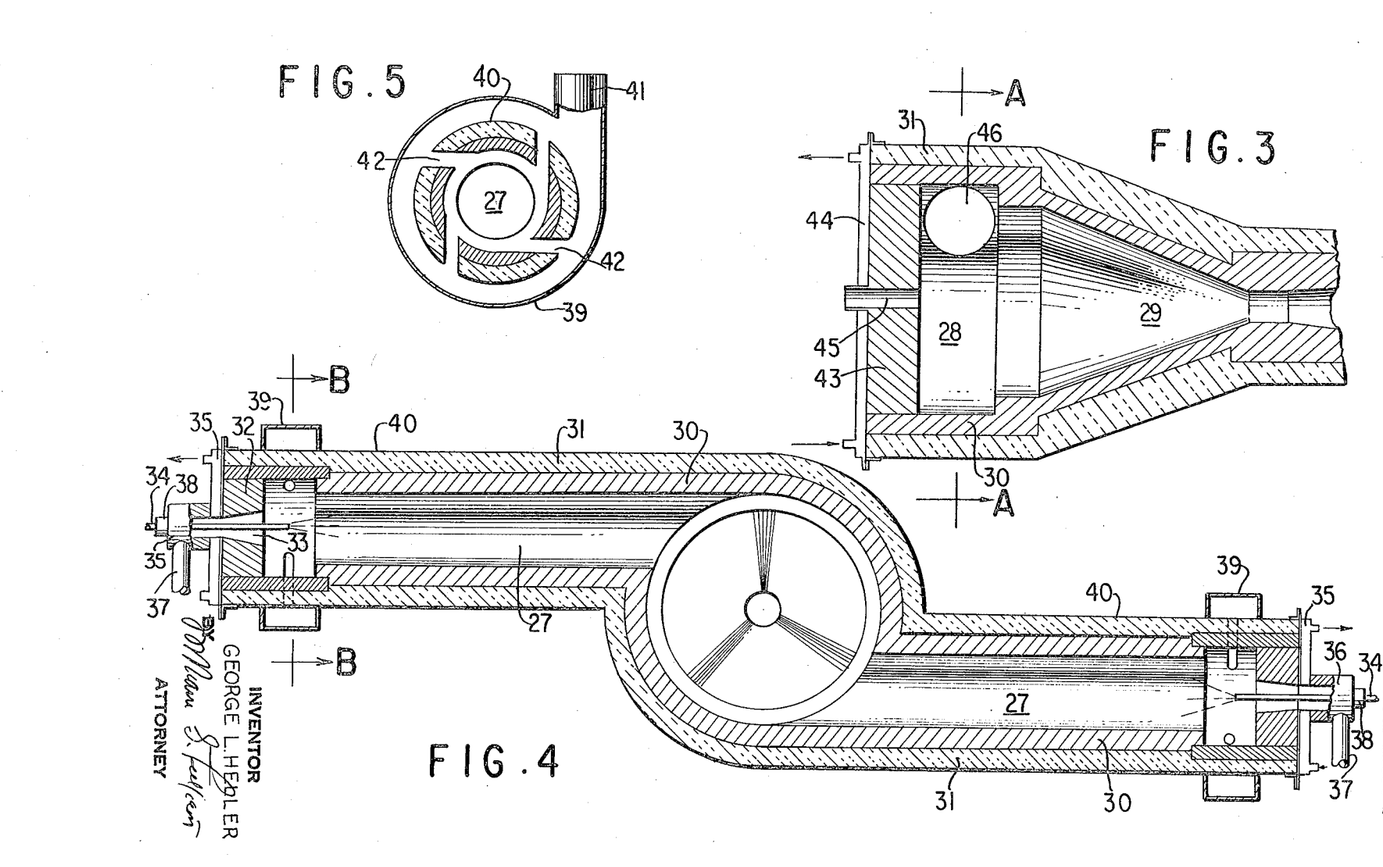
FIGURE 3 is a side view of a fuel combustion section and a convergent frusto-conical section that may be employed with the invention when using normally liquid fuels and air to produce the hot combustion gases.
FIGURE 4 is a cross-sectional view of FIGURE 3 along the line A—A.
FIGURE 5 is a cross-sectional view of FIGURE 4 along the line B—B.

FIGURE 3 illustrates a fuel combustion section which may be employed with a convergent frusto-conical section when carrying out the invention by employing a normally liquid fuel and air to produce the hot combustion gases in which the feedstock hydrocarbon is pyrolzed. Accordingly, the hot combustion gases may be produced essentailly in conformity with the method described in U.S. Patent 2,918,353, issued Dec. 22, 1959 whereby a fluid fuel is burned with a free-oxygen containing gas by injecting the fuel axially into one end of a cylindrical combustion chamber of greater length than diameter, while directing air substantially tangentially into the same end of the combustion chamber, thus mixing the fuel and free-oxygen containing gas and burning the fuel to at least 90% completition as it passes through the combustion chamber to produce a hot, high velocity gas stream substantially free from unconsumed fuel. Subsequently, these hot gases are delivered tangentially into the upstream end of the furnace reaction chamber. To particular advantage, an annular stream of air is simultaneously passed into the combustion chamber co-axially with the fuel stream.

In FIGURE 4, the combustion chambers 27 interconnect tangentially with a cylindrical section 28 of the reaction chamber upstream of the convergent frusto-conical section 29. The combustion chambers and the cylindrical section are lined with a layer of refractory 30 over which a layer of thermal insulation 31 is applied. The exterior end of each combustion chamber is closed with a refractory block 32 having an axial opening 33 for introduction of an axially directed, atomized spray of liquid fuel droplets by means of an atomizer assembly 34, and for introduction of an annular stream of air which is directed co-axially with the spray. The outside end of the refractory block 32 is provided with a water cooling jacket 35. Air is introduced axially into the combustion chamber through wind-boxes 36 having feed conduits 37 through which the air is supplied in metered streams. The wind-boxes are provided with slip collars 38 so that the fuel atomizer assemblies 34 may be adjusted axially within the combustion chambers.

Means for introducing air tangentially into the combustion chambers is most clearly illustrated in FIGURE 5. An air bustle 39 surrounds the outer end of the metal shell 40 that covers the combustion chamber 27. Streams of air, which are metered separately from that introduced through the conduits 37, are fed into each bustle 39 through a conduit 41. Thenceforth, the air enters the combustion chambers forcefully through tangential tunnels 42 which pass through the chamber wall.

In operation, the total amount of air fed into the combustion chambers is proportioned to provide complete ignition of the fuel, while generally providing at least a slight excess of oxygen. The proportioning of axially introduced to tangentially introduced air is balanced to provide suitable mixing of the fuel while preventing excessive impingement of unvaporized fuel droplets on the wall of the combustion chambers, thereby providing essentially complete combustion of the fuel while preventing formation of coke.

In FIGURE 3, the refractory end wall 43 of the cylindrical section 38 of the reaction chamber is provided with a water jacket 44 on its exterior side and an axial opening 45 for introduction and positioning of a feedstock atomizer assembly within the convergent section 29. The opening of the upper combustion chamber 27 into the cylindrical section 28 is represented at 46.

In constructing the furnace reactors shown in FIGURES 1 and 3, various forms of super-duty refractories may be employed for lining the interior of the chambers, e.g. ramming mixes, bricks or pre-cast sections. There is particular advantage in employing pre-cast, pre-fired sections for the frusto-conical sections, since these can be readily formed as strong, dense structures which provide exceptional service life. This provision particularly applies to the outlet region of the convergent section, since the hot gases pass through that section at highest velocity and this dictates the need for a very durable refractory section at that point. Advantageously, the outlet of the convergent section may be followed by a short cylindrical section, such as 1a in FIGURE 1, since this assures prolonged existence of the outlet at its intended diameter, i.e. erosion can occur more quickly when the outlet is sharped-edged because of unequal angulation between the convergent section and the downstream section.

Silicon nitride-bonded silicon carbide has been employed to particular advantage at the outlet of the convergent section, while super-duty firebrick and aluminum oxide refractories have been successfully employed in other sections of the chamber. Light weight, castable alumina "bubble" insulation has proven successful for application over the refractory. At any rate, those skilled in the art will be able to properly select suitable refractory and insulation materials and it will be readily apparent that reactors constructed in accordance with the present invention will provide long service life under extreme operating conditions since all surfaces employed for forming and retaining the hot combustion gases can be massively formed from durable refractory materials.

Figure 6:
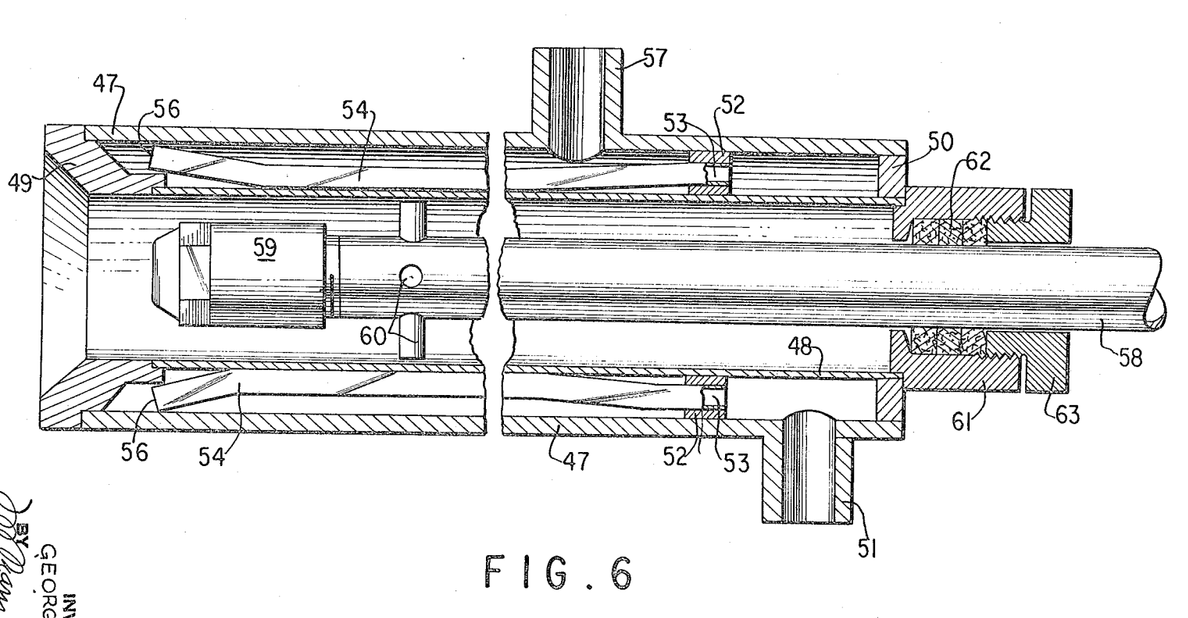
FIGURE 6 is a sectional view of an atomizer assembly which may be employed for injecting liquid feedstock hydrocarbons into the furnace reaction chamber.

In FIGURE 6, a feedstock atomizer assembly is shown which may be employed for injecting an atomized spray of liquid hydrocarbon droplets into the furnace reaction chambers of either FIGURE 1 or FIGURE 3. A water jacket is formed by the outer conduit 47, the inner conduit 48, beveled front piece 49 and the end closure member 50. Cooling water is introduced into the jacket through inlet conduit 51 and flows toward ring-shaped member 52 having a series of orifices 53 passing through the body thereof. Attached to the outer end of the orifices are tubes 54 which extend to the outer end of the jacket space 55. After entering the jacket, water flows through the tubes to the outlets 56 thereof and then flows backward and out of the jacket through outlet conduit 57. Extending axially through the inner space of conduit 48 is a feedstock supply conduit 58 provided with a single-fluid atomizer tip 59 which produces a hollow cone pattern upon discharge of the liquid feedstock. Central positioning and axial alignment of the supply conduit 58 and the atomizer tip 59 is accomplished by means of spacers 60 and the center-bored stuffing box generally represented at 61. The tip 59 may be locked in a selected axial position by compression of the packing 62 in the stuffing box by tightening nut 63, and the tip may be repositioned by loosening the packing. The tip should be positioned so that the discharging hollow cone of droplets clears the beveled surface on the frontpiece 49 while at the same time being partially withdrawn into the heat-shielding confines of conduit 48. In operation, positioning of the atomizer tip in relationship to the outlet of the convergent frusto-conical section may be most readily accomplished by axial movement of the entire feedstock atomizer assembly.

It will be understood that the annular space which exists between the inner wall of jacket conduit 48 and the outer wall of the feedstock supply 58 serves a twofold purpose. It protects the conduit 58 and its contents from exposure to excessive heat while avoiding chilling of the usually heated feedstock as would occur if the surface of conduit 58 were subjected to direct cooling with water or air. Consequently, no fluid is passed through the annular space just mentioned. Where it is, in fact, desirable and practical, the space may be packed with a thermal insulating material.

Example I

An SAF-HS type carbon black was produced with a furnace reactor substantially as depicted in FIGURE 1, except as otherwise indicated, and having the dimensions listed below. The hydrocarbon feedstock atomizer was substantially as depicted in FIGURE 6.

The cylindrical combustion section of the furnace had a diameter of 40 inches I.D. and a length of 10½ inches. Combustion gases were introduced into the cylindrical combustion chamber through eight tangential blast tunnels having an inside diameter of 3 inches. The combustion chamber was provided with an axially located refractory cylinder which had an O.D. of 10 inches and extended inwardly into the chamber for a distance of 10 inches. The convergent frusto-conical section had a cone angle of 38°, an inlet diameter of 40 inches, a length of 48¼ inches and an outlet diameter of seven inches I.D. The convergent section discharged into a cylindrical section having an inside diameter of 7 inches and a length of 5 inches, and this was followed by a divergent frusto-conical section having an inlet diameter of seven inches, a length of 90 inches and an outlet diameter of 18 inches, thus providing a conical angle of 7°. The divergent frusto-conical section discharged into a cylindrical breeching which emptied into a precooler. The length of the breeching was 15 feet and its inside diameter was 18 inches.

For atomizing the liquid feedstock hydrocarbon, the atomizer assembly was equipped with an atomizer tip supplied by Delavan Manufacturing Company, Catalog No. 1/2 WSF 40, which produced a 75° hollow cone of atomized liquid droplets.

Combustion air at ambient temperature was supplied to the furnace at the rate of 210,000 s.c.f.h. while natural gas was supplied as the fuel at the rate of 13,120 s.c.f.h., thus providing an air to fuel ratio of 16/1. The fuel atomizers were equipped with mixing grids, and ignition of the fuel was initiated in the blast tunnels so that a burning mixture of fuel and air was directed tangentially into the combustion chamber. This in turn was formed into a vortex, into which the feedstock hydrocarbon was introduced by means of the atomizer assembly at a rate of 178 gallons (60° F.) per hour after being preheated to a temperature of 300° F.

The feedstock atomizer tip was situated on an axial locus within the convergent frusto-conical section 18 inches upstream from the outlet opening thereof.

The feedstock hydrocarbon employed during this run was a petroleum cracking residue having a composition and characteristics shown in Table I.

TABLE I

Analysis of feedstock hydrocarbon

| | |
|---|---|
| API gravity | .2 |
| Viscosity: | |
| SSU @ 130° F. | 594 |
| SSU @ 210° F. | 67 |
| Molecular weight | 295 |
| BMCI | 123 |
| Index of refraction | 1.648 |
| Wt. percent sulfur | 1.060 |
| Wt. percent ash | .003 |
| Wt. percent benzene insolubles | .039 |
| Wt. percent asphaltenes | .50 |
| UOP K factor | 10.0 |
| Ave. B.P., ° F. | 790 |
| Specific gravity | 1.0744 |
| Lb./gal. | 8.949 |
| Ultimate analysis: | |
| Wt. percent carbon | 89.94 |
| Wt. percent hydrogen | 8.29 |
| Wt. percent sulphur | 1.03 |
| Wt. percent ash | 0.03 |
| Wt. percent other | 0.71 |
| Sodium (Na) p.p.m. | 2.0 |
| Potassium (K) p.p.m. | 0.0 |

NOTE.—This feedstock hydrocarbon was used during each of the examples listed herein.

Carbon black was produced in the reaction chamber of the furnace at temperatures within the range of 3500° F. to 2400° F.

Natural gas at the rate of 6775 s.c.f.h. per hour was introduced into the furnace reaction chamber at a point 14 inches downstream from the inlet to the divergent frusto-conical section. The resultant aerosol was first quenched in the breeching section with water at the rate of 4.40 g.p.m. at a point 2.0 feet downstream from the divergent section outlet and then again with water at the rate of 0.75 g.p.m. at a point 2 feet 10 inches downstream from the first quench point. The aerosol was thus cooled to a temperature of 1600° F. at the second quench point.

During this experiment, the yield of carbon black was 3.5 lbs. per gallon of feedstock hydrocarbon introduced into the furnace, thus giving a daily production rate of about 15,000 lbs.

Example II

Employing the same furnace reactor and feedstock hydrocarbon as in Example I, an ISAF carbon black (ASTM N–220) was produced while maintaining the conditions and input rates of Example I except as hereinafter indicated.

Air at ambient temperature was fed into the blast tunnels at the rate of 186,000 s.c.f.h. while natural gas was introduced at the rate of 12,666 s.c.f.h. to provide an air to fuel ratio of 14.7/1.

Potassium hydroxide was added at the rate of 0.000015 lb./gallon to the feedstock for regulating properties of the carbon black during its manufacture. The feedstock hydrocarbon was injected into the furnace at the rate of 212 gallons (60° F.) per hour. The distance of the feedstock atomizer tip upstream from the outlet opening of the convergent section was 20 inches. No supplemental hydrocarbon was injected into the furnace reaction chamber separately from the feedstock hydrocarbon introduced by means of the atomizer assembly.

In this operation, the carbon black yield was 4.1 pounds per gallon of feedstock hydrocarbon fed into the furnace, thus providing a daily production rate of about 20,900 lbs.

Example III

Using the same furnace reactor and hydrocarbon feedstock, an ISAF-HS type carbon black (ASTM N–242) was produced while maintaining the conditions and input rates of Example I except as indicated hereinafter.

Air at ambient temperature was fed into the blast tunnels at the rate of 175,000 s.c.f.h. while natural gas was introduced as the fuel at the rate of 10,937 s.c.f.h. This provided an air to fuel ratio of 16/1.

The feedstock hydrocarbon was introduced into the furnace reaction chamber at a rate of 174 gallons (60° F.) per hour. The distance of the feedstock atomizer tip upstream of the convergent section outlet was 20 inches.

Natural gas was added to the divergent section of the furnace reaction chamber at the rate of 3645 s.c.f.h. Using water at the rate of 5.33 g.p.m., the aerosol was quenched to a temperature of 1450° F. at a point 58 inches downstream from the outlet of the divergent section. Under these conditions, the carbon black yield was 4.1 lbs. per gallon of feedstock injected into the furnace, thus giving a production rate of about 17,150 lbs. per day.

Example IV

Using the same apparatus as in Example I, as HAF-HS type carbon black (ASTM N–347) was produced with the same feedstock and the same general operating procedures as described in Example I but with other conditions and input rates as described hereinafter.

Air for forming the hot combustion gases was introduced into the furnace at the rate of 175,000 s.c.f.h. while natural gas was introduced as the fuel at the rate of 11,290 s.c.f.h. to provide an air to fuel ratio of 15.5/1.

The feedstock hydrocarbon was introduced into the furnace at the rate of 248 gallons (60° F.) per hour, the feedstock atomizer tip being 20 inches upstream of the outlet of the convergent section. Natural gas was introduced into the divergent section of the reaction chamber at the rate of 3296 s.c.f.h.

Using water at the rate of 4.58 g.p.m., the aerosol was quenched to a temperature of 2120° F. at a point 58 inches downstream from the outlet of the divergent section.

The yield of carbon black was 4.6 lbs. per gallon of feedstock hydrocarbon introduced into the furnace, providing a production rate of about 27,400 lbs. per day.

The properties of the carbon blacks produced in the preceding examples are shown in Table II and are compared to conventional commercial carbon blacks of high quality produced by "swirling blast" processes wherein the same feedstock hydrocarbon was introduced as a spray of liquid droplets into hot combustion gases in a cylindrical combustion chamber and the feedstock—hot combustion gas mixture was subsequently conveyed as a spiral into a cylindrical reaction chamber of smaller diameter than the combustion chamber. The SAF-HS, ISAF-HS and HAF-HS carbon blacks of Table II were all produced while adding natural gas to the carbon black formation zone in accordance with the method for increasing oil absorption of the black as described in the previously mentioned patent, U.S. 2,985,511.

TABLE II

| Carbon Black | ABC Color | Tinting Strength, percent of FF Black | Stiff Paste Oil Absorption, gal./100 lbs. | Transmission, percent | ASTM Iodine Adsorption | Electron Microscope Fineness |
|---|---|---|---|---|---|---|
| SAF-HS of Ex. 1 | 145 | 124 | 17.0 | 97 | 127 | 154 |
| Conventional SAF-HS | 142 | 125 | 16.8 | 95 | 128 | 154 |
| ISAF of Ex. 2 | 141 | 120 | 16.0 | 97 | 115 | 130 |
| Conventional ISAF | 133 | 119 | 15.9 | 96 | 120 | 129 |
| ISAF-HS of Ex. 3 | 135 | 120 | 18.0 | 97 | 117 | 128 |
| Conventional ISAF-HS | 134 | 121 | 17.3 | 96 | 115 | 131 |
| HAF-HS of Ex. 4 | 122 | 108 | 18.5 | 82 | 79 | 108 |
| Conventional HAF-HS | 128 | 109 | 17.8 | 97 | 95 | 110 |

As employed in Table II, the various properties of the carbon blacks are well known in the art and are described in published references. For example, ABC Color, Tinting Strength and Stiff Paste Oil Absorption are described in Sweitzer et al., "The Carbon Spectrum for the Rubber Compounder," Rubber Age, 55, 469 (1944), as indicated in U.S. 3,245,820. Transmission is defined by ASTM Designation D–1618–58T, and Iodine Adsorption, mg./g., by ASTM Designation D–1510 as indicated in U.S. 3,071,443. For a definition of Electron Microscope Fineness, reference is made to "The Particle Size and Shape of Colloid Carbon as Revealed by the Electron Microscope," Columbian Colloid Carbon, vol. II (1940), as indicated in U.S. 3,245,820.

Manufacture of the carbon blacks during the previous examples was accomplished by introducing the feedstock hydrocarbon into the body of a vortex formed from hot combustion gases in which ignition of the fuel was essentially complete at the point where the feedstock hydrocarbon entered the vortex. This fact is illustrated by Table III which presents chromatographic analysis data of gases withdrawn from the furnace reaction chamber during Example III.

TABLE III

CHROMATOGRAPHIC ANALYSIS OF GASES REMOVED FROM FURNACE REACTION CHAMBER, MOLE PERCENT ON DRY BASIS

| Components | Sample Point 1 | Sample Point 2 | Sample Point 3 | Sample Point 4 | Sample Point 5 | Sample Point 6 |
|---|---|---|---|---|---|---|
| $H_2$ | | | .45 | 2.33 | 12.25 | 11.66 |
| $O_2+A$ | 7.76 | 8.11 | 4.60 | 1.27 | .88 | 1.04 |
| $N_2$ | 84.67 | 84.24 | 83.39 | 81.28 | 68.58 | 69.09 |
| $CH_4$ | | | | <.10 | .54 | .50 |
| $CO_2$ | 7.57 | 7.65 | 10.63 | 11.40 | 5.94 | 5.66 |
| $CO$ | | | .93 | 3.72 | 11.16 | 11.72 |
| $C_2H_2$ | | | | <.10 | .65 | .33 |

Sample point

No. 1=20 inches upstream of convergent section outlet.
No. 2=10 inches upstream from convergent section outlet.
No. 3=5 inches upstream from convergent section outlet.
No. 4=Convergent section outlet.
No. 5=24 inches downstream of the divergent section outlet.
No. 6=131 inches downstream of the divergent section outlet.

Since the feedstock hydrocarbon was injected into the furnace chamber during Example III from a point 20 inches upstream of the convergent section outlet, and was projected outwardly and downstream at an angle of 75°, it is clear from Table III that combustion of the fuel was substantially complete at the point where the feedstock entered the vortex, since only $CO_2$, $N_2$, and $O_2+$ argon were found at Points 1 and 2, while finding no fractions of $CH_4$, $C_2H_2$, CO or $H_2$ which would indicate non-combustion or cracking of the fuel at those points. Initiation of cracking of the feedstock hydrocarbon is indicated by the presence of small amounts of $H_2$ and CO in the sample taken from Point 3. It should also be pointed out that carbon black was found in samples removed from Points 3–6, but not from the samples taken from Points 1 and 2. The sample removed from Point No. 4 indicates that pyrolysis of the feedstock was proceeding at a significant rate, although substantially incomplete, while the samples from Points 5 and 6 indicate substantially complete pyrolysis of the feedstock at those points.

Table IV lists the roadwear ratings of the carbon blacks of Table III, the rating values being relative to the conventionally produced ISAF black.

TABLE IV

Carbon black: Treadwear rating overall, percent
SAF-HS of Ex. I _____________________________ 113
Conventional SAF-HS ________________ 108
ISAF of Ex. II _____________________________ 107
Conventional ISAF _____________________ 100
ISAF-HS of Ex. III _____________________ 110
Conventional ISAF-HS _________________ 104
HAF-HS of Ex. IV _____________________ 97
Conventional HAF-HS _________________ 93

In acquiring the data shown in Table IV, the carbon blacks were compounded with a blend of oil extended styrene-butadiene rubber and polybutadiene rubber. The formulation of the treadstock compounds is shown in Table V.

TABLE V

| Component: | Parts by weight |
|---|---|
| SBR–1712 | [2] 96.0 |
| Cis-1,4-polybutadiene rubber | 30.0 |
| Carbon black | 70.0 |
| Circosol 2XH [1] | 24.0 |
| Zinc oxide | 4.0 |
| Stearic acid | 2.0 |
| Thermoflex A [1] | 1.5 |
| NOBS Special [1] | 1.2 |
| Sulfur | 2.0 |

[1] Registered trade names (see Table IX).
[2] 70 parts polymer, 26 parts oil.

The treadstocks were then used to build tires of the same type and size from each treadstock composition and the finished tires were road tested on the same make and model automobile under uniform test conditions on a tire testing course. After 12,000 miles of running on the course, the thickness of the treads were measured to determine the extent of wear.

It should be pointed out that commonly employed laboratory tests which measure the abrasion resistance of a rubber compound containing carbon black do not provide the reliable index of treadwear obtained by actual testing of the treadstock under carefully controlled road-testing conditions. For instance, carbon blacks which demonstrate a high abrasion resistance in a laboratory test may give poor roadwear in a commercial treadstock.

Setting the conventional ISAF as an arbitrary standard of comparison (since it is a commonly employed grade for treadstock reinforcement), the other carbon blacks were rated against it. By reference to Tables II and IV, it can be seen that the ISAF carbon black of Example II gave an outstanding advantage in resistance to roadwear, i.e., 7% better, over the ISAF carbon produced by the conventional means previously described. This advantage in roadwear would not have become apparent to one skilled in the art by comparing the colloidal properties of the two blacks, because in this regard they were essentially identical.

As previously pointed out, both the ISAF-HS blacks of Table IV were produced while adding natural gas to the carbon black formation zone, to produce carbon blacks having properties different from those obtained when downstream addition of a supplemental hydrocarbon is excluded. Although the conventional ISAF-HS gave a good wear rating of 104%, it can be seen that the same type of black gave a rating of 110% when produced in accordance with the present invention. This result would also have been unapparent from comparing the colloidal properties of the two blacks.

The treadwear of two HAF-HS blacks is compared in Table IV. The fact that neither of these gave wear ratings as good as the conventional ISAF black does not indicate discrepancy in quality since equivalent wear is never expected from ISAF and HAF-HS grades. Nonetheless, it is important to note that the carbon black of Example IV wore almost as well as the conventional ISAF black.

While the treadwear advantages provided by the blacks of Examples II, III and IV are readily apparent, the properties or characteristics which provided the improvements in wear have not been detectable by any currently known tests. Numerous theories have been advanced to explain their superiority but these theories remain unproven, e.g., blacks which are better wetted by the polymer and are thus better bonded therewith, and blacks which have a higher hardness value and thus a higher resistance to frictional wear.

It should be re-emphasized that the unexpected super-wearing characteristics provided by carbon blacks of this invention have been obtained when the treadstock composition comprises polybutadiene rubber. In this regard it should be pointed out that these super-wearing characteristics are obtained with any commercial type of polybutadiene rubber, i.e. cis- or trans-varieties, and combinations of the two, when produced by either solution or emulsion polymerization processes. Furthermore, these super-wearing characteristics prevail to an unexpected degree even when the polybutadiene is blended with another compatible rubber, e.g. styrene-butadiene rubber, natural rubber or polyisoprene rubber. When, for instance, carbon blacks of the present invention are compounded into a treadstock comprising polybutadiene and another rubber, the wear resistance afforded the treadstock comprising a blend of the rubbers is significantly greater than would be expected by comparison to the wear resistance of treadstocks comprising either of the rubbers when not blended with the other.

This discovery is clearly illustrated in Table VI and VII which show the wear ratings of the unblended polybutadiene rubber, styrene-butadiene rubber and natural rubber, in comparison to blends of these same rubbers with polybutadiene.

TABLE VI

WEAR RATINGS IN PERCENT OF CONVENTIONAL BLACKS, 12,000 MILES

| Polymer | Compound A | | Compound B | | Compound C | |
|---|---|---|---|---|---|---|
| Styrene-Butadiene Rubber, percent | 100 | | 50 | | 0 | |
| Polybutadiene Rubber, percent | 0 | | 50 | | 100 | |
| | Overall | Center Line | Overall | Center Line | Overall | Center Line |
| Wear, percent: | | | | | | |
| Conventional HAF-HS Black of Table II | 100 | 100 | 100 | 100 | 100 | 100 |
| HAF-HS Black of Ex. IV | 100 | 99 | 101 | 105 | 101 | 103 |
| Conventional ISAF Black of Table II | 100 | 100 | 100 | 100 | 100 | 100 |
| ISAF Black of Ex. II | 94 | 91 | 111 | 112 | 105 | 108 |

TABLE VII

WEAR RATINGS IN PERCENT OF CONVENTIONAL BLACKS, 12,000 MILES

| Polymer | Compound D | | Compound E | | Compound F | |
|---|---|---|---|---|---|---|
| Natural Rubber, percent | 100 | | 50 | | 0 | |
| Polybutadiene Rubber, percent | 0 | | 50 | | 100 | |
| | Overall | Center Line | Overall | Center Line | Overall | Center Line |
| Wear, percent: | | | | | | |
| Conventional HAF-HS Black of Table II | 100 | 100 | 100 | 100 | 100 | 100 |
| HAF-HS Black of Ex. IV | 95 | 95 | 112 | 106 | 112 | 111 |
| Conventional ISAF Black of Table II | 100 | 100 | 100 | 100 | 100 | 100 |
| ISAF Black of Ex. II | 98 | 102 | 104 | 106 | 94 | 104 |

Since identical compounding formulations could not be employed for each of the rubbers, the recipes for compounds A through E of Tables VI and VII were varied to provide maximum wear and tire failure resistance for each compound. The treadstock formulation for each of the aforementioned compounds is shown in Table VIII.

A number of the materials shown in Table VIII are identified by Registered Trade names. These materials are generically identified in Table IX.

As can be seen from Tables VI and VII, the carbon blacks of the present invention did not effect particularly impressive treadwear ratings when compounded with styrene-butadiene rubber or natural rubber alone (compounds A and D, respectively). However, when the carbon blacks are compounded with polybutadiene alone (compounds C and F, respectively) significant increases in the treadwear of that rubber were effected by incorporation of the carbon blacks of this invention. It is especially significant to note that when the natural rubber and the styrene-butadiene rubber were blended with the polybutadiene rubber (compounds E and B, respectively), that marked improvement in the treadwear resistance of the blends was provided by the carbon blacks of this invention. While the increased wear resistance provided to the polybutadiene treadstock was a most unexpected result, the treadwear resistance afforded the blends is even more surprising, since one skilled in the art would have expected the wear rating of the blends to be more or less of an average value between those obtained with the two rubbers when unblended. When forming a treadstock of blended rubbers comprising polybutadiene, the amount of polybutadiene required to provide super normal treadwear resistance to the blend will vary, but generally should be above about 20% by weight, of the total amount of rubber employed.

While the invention has been described with considerable reference to manufacture of carbon blacks which impart super-wearing characteristics to treadstocks containing polybutadiene, it should be re-emphasized the present inventon may also be employed for producing carbon blacks suitable for use in other tire tread compositions, tire parts other than treads, industrial rubber goods, paints, plastics, inks, and the like, where suitable for the intended application.

TABLE VIII

Compound A

| Material: | Parts by wt. |
|---|---|
| OEP-1712 | [2] 137.50 |
| Carbon black | 68.75 |
| Zinc oxide | 4.20 |
| Stearic acid | 2.80 |
| Agerite HP [1] | 1.40 |
| Santoflex AW [1] | 1.40 |
| Circosol 2XH [1] | 5.50 |
| Sulfur | 1.80 |
| NOBS Special [1] | 1.00 |
| Diphenylguanidine | 0.35 |

Compound B

| Material: | Parts by wt. |
|---|---|
| Cis-1,4 polybutadiene | 50.00 |
| SBR-1712 | [3] 68.75 |
| Carbon black | 60.00 |
| Circosol 2XH [2] | 20.00 |
| Zinc oxide | 4.00 |
| Thermoflex A [2] | 1.00 |
| Santoflex AW [2] | 1.00 |
| Santocure NS [2] | 1.20 |
| Sulfur | 1.75 |

Compound C

| Material: | Parts by wt. |
|---|---|
| Cis-1,4 polybutadiene | 100.00 |
| Carbon black | 70.00 |
| Sundex 53 [1] | 37.50 |
| Zinc oxide | 5.00 |
| Stearic acid | 2.00 |
| Thermoflex A [1] | 1.00 |
| Santoflex AW [1] | 1.00 |
| Santocure NS [1] | 0.80 |
| Sulfur | 1.50 |

Compound D

| Material: | Parts by wt. |
|---|---|
| Natural rubber | 100.00 |
| Carbon black | 50.00 |
| Pine tar | 3.00 |
| Zinc oxide | 3.00 |
| Stearic acid | 3.00 |
| Thermoflex A [1] | 1.00 |
| Vultrol [1] | 0.50 |
| NOBS Special [1] | 0.35 |
| Sulfur | 2.60 |

Compound E

| Material: | Parts by wt. |
|---|---|
| Natural rubber | 50.00 |
| Cis-1,4 polybutadiene | 50.00 |
| Carbon black | 60.00 |
| Sundex 53 [1] | 20.00 |
| Zinc oxide | 4.00 |
| Stearic acid | 2.00 |
| Thermoflex A [1] | 1.00 |
| Santocure NS [1] | 0.50 |
| Sulfur | 2.00 |

Compound F

| Material: | Parts by wt. |
|---|---|
| Cis-1,4 polybutadiene | 100.00 |
| Carbon black | 70.00 |
| Sundex 53 [1] | 37.50 |
| Zinc oxide | 5.00 |
| Stearic acid | 2.00 |
| Thermoflex A [1] | 1.00 |
| Santocure NS [1] | 0.80 |
| Sulfur | 1.50 |

[1] Registered trade names.
[2] 100 pts. polymer, 68.75 pts. oil.
[3] 50 pts. polymer, 18.75 pts. oil.

TABLE IX

Agerite HP—phenyl-beta-napthylamine plus diphenyl-para-phenlylene-diamine; antioxidant; R. T. Vanderbuilt Co.

Santoflex AW—6 ethoxy - 1,2 - dihydro - 2,2,4-trimethylquinoline; antioxidant and ozone protector, Monsanto Chemical Co., Rubber Chemicals Dept.

Circosol-2XH—Special heavy hydrocarbon structure derived from petroleum; processing aid, extender and plasticizer; Sun Oil Co.

NOBS Special—N-oxydiethylene benzothiazole - 2 - sulfenamide; delayed action accelerator; American Cyanamid Co., Rubber Chemicals Dept.

Thermoflex A—di - para-methoxy - di - phenylamine, diphenyl-para-phenylene-diamine and Neozone D; antioxidant; E. I. du Pont de Nemours & Co., Elastomer Chemicals Dept.

Santocure NS—n-Tert-butyl-2-benzothiazole sulfenamide; accelerator; Monsanto Chemical Co., Rubber Chemicals Dept.

Sundex 53—A moderately aromatic product derived from petroleum; extender, plasticizer and processing aid; Sun Oil Co.

Vultrol—n - Nitroso-di-phenylamine; retarder - activator used as anti-scorching agent and for recovery of scorched stocks; B. F. Goodrich Chemical Co.

It is understood that various modifications can be made with respect to the invention herein described by those skilled in the art without departing from the scope of the appended claims:

I claim:

1. In a process for producing carbon black by pyrolysis of a hydrocarbon feedstock with heat absorbed from a body of hot combustion gases within which said hydrocarbon is dispersed, said body of hot combustion gases being produced by combustion of a fuel with a free oxygen-containing gas and having a temperature whereby the feedstock hydrocarbon is substantially completely decomposed while dispersed therein, said pyrolysis reaction being carried out within the reaction chamber of a furnace to produce an aerosol of carbon black suspended in gaseous products of combustion and thermal decomposition, the aerosol being subsequently removed from the chamber and fractionated for recovery of the carbon black, the method for producing an improved tread grade of black characterized by increased roadwear resistance of a polybutadiene rubber-containing tire tread which contains said black comprising the steps of:

(a) passing the hot combustion gases through a convergent frusto-conical section of said reaction chamber in a spiraling path, said convergent section having an included angle between about 30° and about 90° and a length at least about equal to the diameter of the outlet of the convergent section, (b) thus forming a rapidly spinning vortex of the hot combustion gases having a substantial vortex cavity near the center of said convergent section and a vortex body adjacent the inner wall thereof, said vortex body contracting into a progessively tighter spiral as the hot combustion gases course through said convergent section, (c) releasing the feedstock hydrocarbon within said convergent section intermediate each end thereof and at a point upstream of the outlet thereof at a distance which is at least as great as the diameter of the outlet, directing said released hydrocarbon toward the inner wall of said convergent section and into the body of the vortex adjacent the inner wall thereof prior to substantial thermal decomposition of said hydrocarbon, combustion of the fuel employed for supplying heat for pyrolysis of the feedstock hydrocarbon being substantially completed at the point where the feedstock hydrocarbon enters said body of the vortex.

(d) thoroughly mixing with and at least partially pyrolizing the predominate portion of said released feedstock hydrocarbon within the hot gases forming the body of the vortex adjacent the inner wall of the convergent section, rather than within the central cavity of the vortex, substantially prior to discharging the components of the vortex from said convergent section.

2. The process of claim 1 in which the vortex has an included angle of between about 35° to 45°, a length of at least about four times the outlet diameter of the convergent section of the furnace reaction chamber, and the feedstock hydrocarbon is introduced into the convergent section of the furnace reaction chamber at a point upstream of the outlet thereof at a distance therefrom which is between about one to four times the diameter of the outlet.

3. The process of claim 1 in which the feedstock hydrocarbon is introduced into the frusto-conical section of the reaction chamber from an axial locus and is projected outwardly from said locus so as to traverse the "eye" of the vortex and pass into the body of the vortex adjacent the inner wall of the convergent section.

4. The process of claim 1 in which the feedstock hydrocarbon is normally non gaseous and is introduced into the frusto-conical section as an atomized spray of liquid droplets.

5. The process of claim 4 in which the feedstock hydrocarbon is a high molecular weight, highly aromatic hydrocarbon residue.

6. The process of claim 1 in which the contracted vortex is discharged from the convergent frusto-conical section and reformed into a progressively expanding body of gases by passage into a downstream section of the reaction chamber having a diameter larger than the outlet of the convergent section.

7. The process of claim 6 in which the hot combustion gases discharge into a divergent frusto-conical section as a flowing body characterized by plug or linear flow wherein the gases flow substantially longitudinally at a velocity which is relatively uniform over the entire cross-section and length of the divergent frusto-conical section.

8. The process of claim 1 in which the hot gases discharge from the convergent frusto-conical section of the furnace reaction chamber at a longitudinal velocity within the range of about 300 to about 2600 linear feet per second at a temperature within the range of about 2500° to about 2800° F.

9. The process of claim 1 in which the combustible mixture is burned at a rate which produces a velocity of at least 300 linear feet per second at the outlet of the convergent frusto-conical section of the furnace reaction chamber, and the feedstock hydrocarbon is a high molecular weight, highly aromatic residue that is introduced into said frusto-conical section at a rate within the range of 0.8 to 2.5 gallons (60° F.) per 1000 cubic feet (standard) of air utilized in formation of the combustion mixture.

10. The process of claim 1 characterized at fixed operating conditions by decreasing fineness and increasing structure properties of the resultant carbon black as the point of entry of the feedstock hydrocarbon into the vortex is retracted incrementally from the convergent section outlet, in which the feedstock hydrocarbon is introduced into the body of the vortex within a zone intermediate each end of the convergent section, said zone being shorter than the entire length of said section and a significant distance upstream thereof, the feedstock entering said zone within a range identified by a point at which carbon black is produced having the fineness and structure approximately optimized for a maximum value of each and a point further upstream where the carbon black is produced having a fineness somewhat coarser and a structure somewhat higher than the first said point.

11. Furnace for manufacture of carbon black comprising:
(a) a refractory lined reaction chamber of essentially circular cross-section including a convergent frusto-conical section through which hot combustion gases spiral in the form of a vortex toward an outlet located at the small end of the convergent section transversally of the longitudinal axis thereof, said convergent section having an included angle between about 30° and about 90° and a length at least about equal to the diameter of the outlet of the convergent section,
(b) one or more burners for substantially complete oxygen ignition of fuel employed for supplying heat for pyrolysis of a feedstock hydrocarbon whereby said ignition is substantially completed before the resultant hot combustion gases are mixed with the feedstock hydrocarbon, said burner means being adapted to inject said hot combustion gases into the reaction chamber from a point toward the large end of said convergent section while providing tangential motion to said hot gases and to direct their flight toward the sloping inner wall of said convergent section, thus creating a vortex of the gases having a substantial vortex cavity and the body of which is adjacent said sloping wall, and
(c) feedstock injection means for releasing a feedstock hydrocarbon within said convergent section intermediate each end thereof and from a point upstream of the outlet thereof at a distance which is at least as great as the diameter of the outlet, said injection means being adapted to direct the released feedstock hydrocarbon toward the inner wall of said convergent section and into the body of the gaseous vortex adjacent to said wall,
whereby a predominate portion of the released feedstock hydrocarbon is thoroughly mixed and at least partially pyrolyzed within the body of the vortex adjacent the inner wall of the convergent section.

12. Apparatus of claim 11 in which the furnace reaction chamber includes a fuel combustion section that interconnects with the large end of the convergent section and the one or more burners discharge into said fuel combustion section.

13. The apparatus of claim 12 in which the fuel combustion section has essentially the same diameter as the large end of the convergent section.

14. The apparatus of claim 12 including an axially located, inwardly extending heat resistant cylinder within the combustion section to provide an annular space into which the combustion gases discharge from the one or more tangentially directed burner tunnels.

15. The apparatus of claim 11 in which the means for introducing feedstock hydrocarbon into the convergent section has a hydrocarbon discharge locus which is axially located with respect to the convergent section and discharges said hydrocarbon outwardly towards the internal sloping wall of said convergent section.

16 The apparatus of claim 15 in which the means for introducing the feedstock hydrocarbon into the furnace chamber is a spray which provides a hollow cone discharge pattern into the body of the vortex of gases within the convergent section.

17. The apparatus of claim 11 in which the furnace reaction chamber includes an interconnecting section downstream of the convergent frusto-conical section, the downstream section having a diameter larger than the convergent section outlet.

18. The apparatus of claim 17 in which the downstream section interconnects with the convergent section through a short cylindrical section.

19. The apparatus of claim 17 in which the downstream section has a frusto-conical configuration that is divergent with respect to the convergent section outlet.

20. The apparatus of claim 19 in which the inlet to the divergent section is essentially the same diameter as the convergent section outlet.

21. The apparatus of claim 19 in which the inlet to the divergent section is essentially the same diameter as the convergent section outlet and said convergent section has an included angle of between about 7° and 10°.

References Cited

UNITED STATES PATENTS

| | | | |
|---|---|---|---|
| 2,781,247 | 2/1957 | Krejci | 23—209.4 |
| 2,782,101 | 2/1957 | Heller | 23—209.4 |
| 2,851,337 | 9/1958 | Heller | 23—209.4 |
| 3,256,065 | 6/1966 | Latham | 23—259.5 |
| 3,256,066 | 6/1966 | Higgins | 23—259.5 |

FOREIGN PATENTS 569,418  1/1959  Canada.

EDWARD J. MEROS, Primary Examiner

U.S. Cl. X.R.

23—259.5